(12) United States Patent
Levine

(10) Patent No.: US 6,504,818 B1
(45) Date of Patent: Jan. 7, 2003

(54) FAIR SHARE EGRESS QUEUING SCHEME FOR DATA NETWORKS

(75) Inventor: Ronald M Levine, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/204,258

(22) Filed: Dec. 3, 1998

(51) Int. Cl.$^7$ .............................................. H04I 12/00
(52) U.S. Cl. ...................... 370/229; 370/235; 370/230; 370/231; 370/395.21; 370/395.41
(58) Field of Search ................................ 370/222–229, 370/230–231, 395.21, 395.41, 236.1, 412, 415, 419, 420, 235

(56) References Cited

U.S. PATENT DOCUMENTS

| | | | | |
|---|---|---|---|---|
| 5,335,224 A | * | 8/1994 | Cole et al. ..................... | 370/84 |
| 5,633,859 A | * | 5/1997 | Jain et al. .................... | 370/234 |
| 5,633,861 A | * | 5/1997 | Hanson et al. ............... | 370/232 |
| 5,696,764 A | * | 12/1997 | Soumiya et al. ............. | 370/395 |
| 5,805,599 A | * | 9/1998 | Mishra et al. ............... | 370/468 |
| 6,069,872 A | * | 5/2000 | Bonomi et al. .............. | 370/235 |

* cited by examiner

*Primary Examiner*—Douglas Olms
*Assistant Examiner*—Van Nguyen

(57) ABSTRACT

A method of controlling congestion in data networks wherein data is received by an egress port and buffered in a local buffer associated with a source of the element. For each data element received, the egress port determines whether a global threshold is exceeded and, if so, requests all data sources to reduce their rate of data delivery to the egress port. Similarly, the egress port determines whether a local threshold is exceeded and, if so, requests the one source associated with the local buffer to reduce the data delivery rate to the egress port. Optionally, if the data delivery rate of the one source falls below a predetermined minimum rate, the one source may refuse the request. In response, the egress port requests other data sources to reduce their rate of data delivery to the egress port.

15 Claims, 3 Drawing Sheets

FAIR SHARE EGRESS QUEUING SCHEME FOR DATA NETWORKS

BACKGROUND OF THE INVENTION

The present invention relates to resource management techniques in data networks and, more particularly, to resource management techniques that control network congestion and guarantee fairness to customers.

Data networks are in common use. Conventional networks include frame relay, packet relay and cell relay networks. Typically, such networks receive data from a plurality of data sources and format the data into data "elements," which may be frames, packets or cells of data depending upon the network type. The data elements are routed through the data network to one or more destinations. A destination is commonly referred to as an "egress port" because by consuming, storing or otherwise disposing of data, data elements exit from the data network. An exemplary data network is disclosed in U.S. Pat. No. 5,335,224, entitled "Service Guarantees/Congestion Control in High Speed Networks;" the entirety of the patent's disclosure is incorporated herein by reference.

Data networks are subject to capacity ("bandwidth") limitations. Network proprietors typically contract with each source to route a certain amount of data from the source to a destination. Thus, each source is associated with a "contract rate" (CR) of data representing a minimum data rate that the data network should accept from the source. However, each source may be capable of providing data at a much higher rate. Each source also is associated with an "availability rate" (A) representing a rate at which the source may furnish data to the network.

Not all sources are active at the same time. At times the aggregate contracted rates of the active sources may not consume the network's capacity. When this occurs, the data network distributes the excess bandwidth to the active sources. The data network, in effect, accepts more data from one or more sources than it is required to accept. It is an object of data networks to allocate excess bandwidth to the active sources fairly. No known control scheme for data networks provides a fair share queuing scheme in data networks to distribute excess bandwidth to data sources.

Control schemes for data networks are known to allocate excess bandwidth and moderate network congestion. Network congestion occurs when data is developed to a particular egress port at a rate that exceeds the egress port's data capacity. Without such control schemes, the excess data would be lost. Sources would have to retransmit the data once the sources and egress ports determined that data loss occurred. Control schemes may provide for global congestion detection in which an egress port monitors the rate at which it receives data. If a global congestion threshold is exceeded, the egress port generates a feedback control signal to all sources causing the sources to reduce the rate at which they deliver data to the network for delivery to the egress port. Other control schemes provide for local congestion detection, in which the egress port identifies individual sources from which it receives data. If data received from any one source exceeds a local congestion threshold associated with the source, the egress port generates a second type of feedback control signal to the source causing it to reduce the rate at which it generates data for the egress port.

Global congestion detection does not provide for fair share of excess bandwidth. Consider the example illustrated in FIG. 1, where three sources route data to a single egress port. The egress rate of the egress port is 128 Kbps. The contracted rates and availability rates of the sources are as follows:

| Source   | Contracted Rate ($CR_i$) | Availability rate ($A_i$) |
| -------- | ------------------------ | ------------------------- |
| Source 1 | 8 Kbps                   | 64 Kbps                   |
| Source 2 | 8 Kbps                   | 64 Kbps                   |
| Source 3 | 4 Kbps                   | 128 Kbps                  |

The control signal of the global congestion detection causes the sources to reduce the delivery of data equivalently. If all sources delivered data at the availability rate, the sources would exceed the capacity of the egress port by 128 Kbps.

$$\left( \sum_{S1}^{S3} A_i = 256 \text{ Kbps} \right).$$

The egress port would cause the sources to decrease delivery of data in equal amounts until the total amount of data delivered to the egress port matched the egress port's egress rate. Experimental results demonstrate that the actual rate of data delivery from the sources in the above example would be:

| Source   | Actual Data Rate ($ADR_i$) | Ratio of $ADR_i$ to $CR_i$ |
| -------- | -------------------------- | -------------------------- |
| Source 1 | 21 Kbps                    | 2.625                      |
| Source 2 | 21 Kbps                    | 2.625                      |
| Source 3 | 86 Kbps                    | 21.5                       |

Although source 3 has the lowest CR of any source and caused most of the congestion at the egress port, the data network allocates an overwhelming majority of its excess bandwidth to it. This is unfair.

Local congestion control also fails to allocate excess bandwidth fairly. In this scheme, data elements received by the egress port are segregated by source and entered into local buffers associated with each source. When an amount of data in one of the local buffers becomes too large, the egress port sends a control signal to the associated source causing the source to throttle down. The following example demonstrates how this control scheme is unfair as well.

Consider the three source example of FIG. 1. In this example, the egress port has an egress data rate of 1536 Kbps. The contracted rates and availability rates of the sources are as follows:

| Source   | Contracted Rate ($CR_i$) | Availability Rate ($A_i$) |
| -------- | ------------------------ | ------------------------- |
| Source 1 | 4 Kbps                   | 1536 Kbps                 |
| Source 2 | 4 Kbps                   | 1536 Kbps                 |
| Source 3 | 1024 Kbps                | 1536 Kbps                 |

Egress ports typically drain data from each local buffer at a rate proportional to the amount of data in the respective local buffer. The drain rate and the size of the local thresholds contribute to the throughput from each source. Although the local thresholds may be set to reflect the contracted rate of the respective source, the contribution of the drain rate causes the throughput to deviate from the contracted rate. Experimental data run on a known local congestion control scheme using the above figures demonstrates that the local congestion control system is unfair. It results in the following throughput:

| Source | Actual Data Rate (ADR$_i$) | Ratio of ADR$_i$ to CR$_i$ |
| --- | --- | --- |
| Source 1 | ⁻300 Kbps | 75 |
| Source 2 | ⁻300 Kbps | 75 |
| Source 3 | ⁻800 Kbps | 0.78 |

To meet its contracted rate, the ADR$_i$ to CR$_i$ ratio should be at least 1 for each source. Thus, local congestion control causes the network to fail to meet the contracted rate with respect to Source 3. It is not delivering the data rate that the network is obligated to deliver even though the contracted rate to the egress port is less than the capacity of the egress port. Local congestion control schemes are not fair.

No known control scheme for data networks includes both global congestion control and local congestion control.

Accordingly, there is a need in the art for a data network control scheme that fairly allocates excess bandwidth in the network to active sources. Further, there is a need in the art for such a control scheme that guarantees conformance to data rates that the network is obligated to carry from individual sources.

SUMMARY OF THE INVENTION

The disadvantages of the prior art are alleviated to a great extent by a method of controlling congestion in data networks, wherein when data is buffered at an egress port, it is buffered in a local buffer associated with a source of the element. For each data element received, the egress port determines whether a global threshold is exceeded and, if so, requests all data sources to reduce their rate of data delivery to the egress port. Similarly, the egress port determines whether a local threshold is exceeded and, if so, requests the one source associated with the local buffer to reduce the data delivery rate to the egress port.

Optionally, if the data delivery rate of the one source falls below a predetermined minimum rate, the one source may refuse the request. In response, the egress port requests all other data sources to reduce their rate of data delivery to the egress port.

DETAILED DESCRIPTION

The present invention provides a control scheme for a destination that fairly allocates excess bandwidth to a plurality of sources. The destination includes a buffer and an egress port. The buffer is logically divided into sub-buffers, "local buffers," associated with each source in the data network that sends data to the destination. The local buffers may be assigned dynamically as sources activate and deactivate. The data network stores data delivered to the destination from the data network in the local buffer associated with the issuing source. The egress port drains data from the buffer and consumes it as indicated.

The buffer is provided with a global queue threshold. The global queue threshold represents an amount of data that may be delivered from the data network to the destination without overcoming the egress point. The buffer is also provided with local queue threshold associated with each local buffer.

Figure 2:
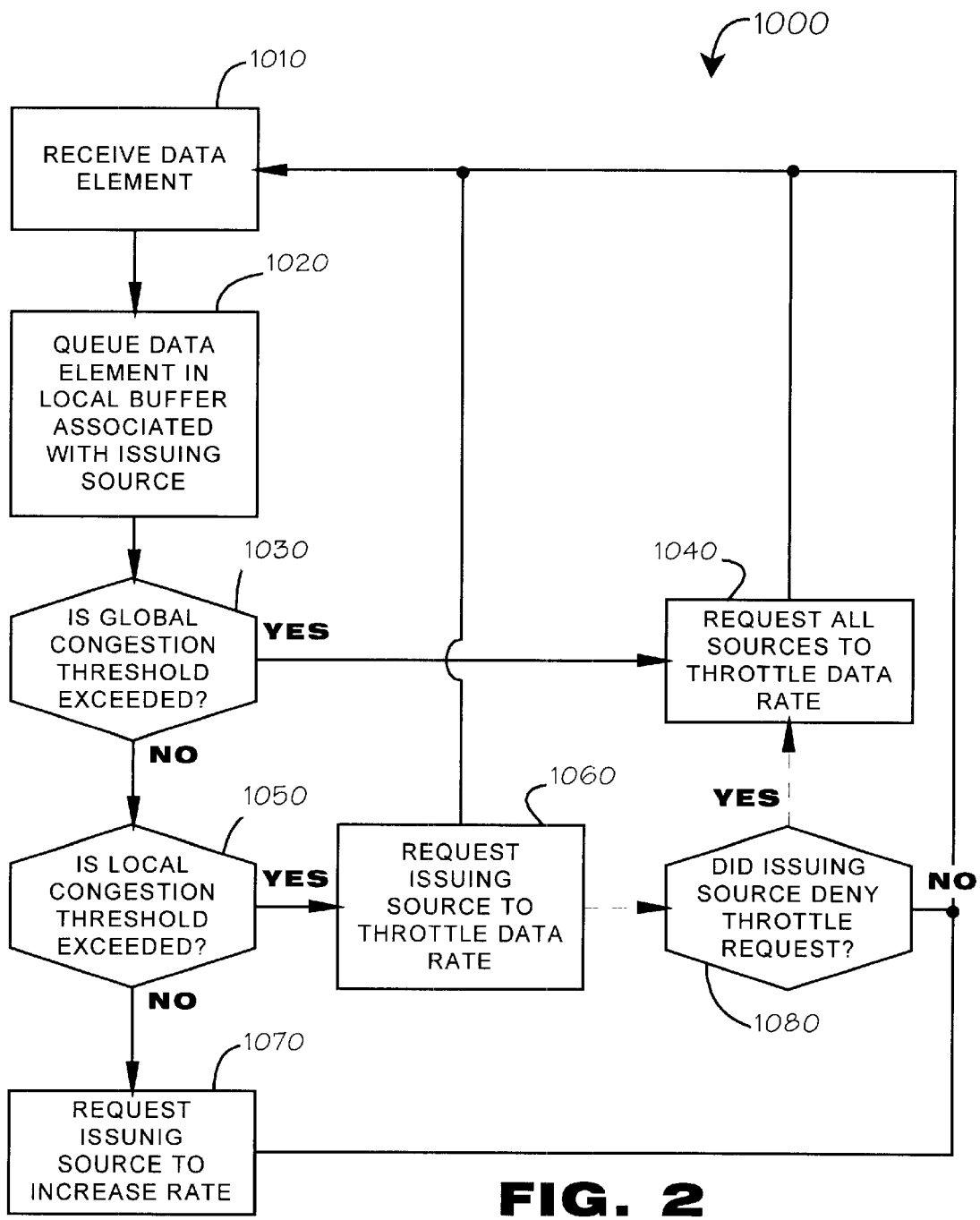
FIG. 2 is a flow diagram illustrating a method of operation of a destination according to an embodiment of the present invention.

According to an embodiment of the present invention, the egress port executes the method shown in FIG. 2 to allocate excess bandwidth among the sources. The egress port buffer receives each data element from the network and identifies the source that issued the element (Step 1010). Typically, data elements such as frames, packets and cells include identifiers of the source of the element. The egress port buffer queues the data element in a local buffer associated with the source of that data element (Step 1020).

Once queued, the egress port buffer determines whether the global congestion threshold is exceeded (Step 1030). If so, the egress port buffer communicates with all active sources requiring them to throttle down the data rates at which they deliver data to the egress port (Step 1040).

If the global congestion threshold is not exceeded, the egress port determines whether the local congestion threshold of the issuing source is exceeded (Step 1050). If so, the egress port communicates with the issuing source causing it to throttle down the rate at which it delivers data to the egress port (Step 1060). Otherwise, the egress port communicates with the issuing source to cause it to increase the rate at which it delivers data to the egress port (Step 1070).

Optionally, the egress port may be configured to monitor signals generated by the sources in response to the request issued at step 1060. The egress port may determine whether the issuing source denied the request to throttle down (Step 1080). If so, the egress port advances to step 1040 and requests other sources to throttle down.

Figure 3:
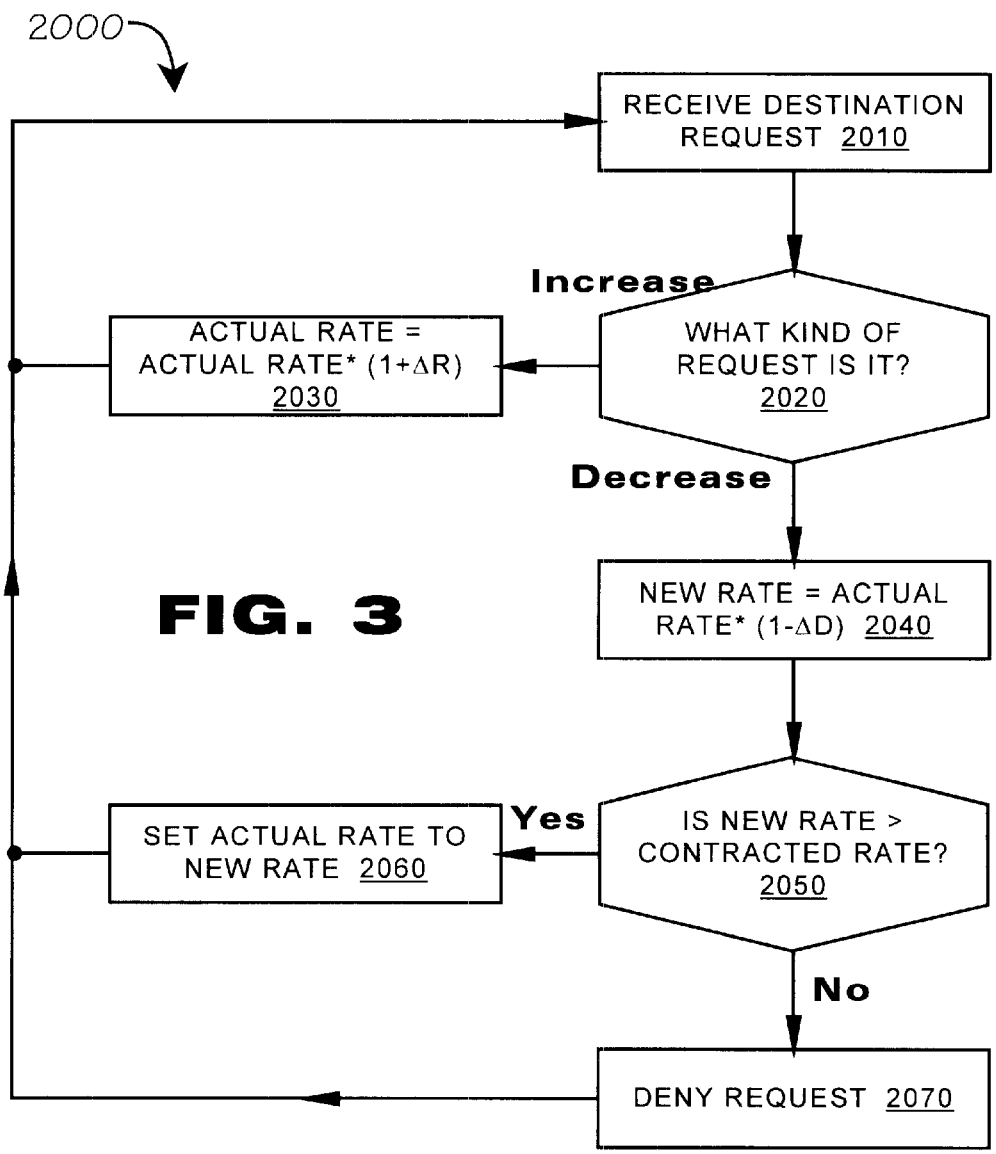
FIG. 3 is a flow diagram illustrating a method of operation of a source according to an embodiment of the present invention.

According to an embodiment of the present invention, sources respond to destination requests as shown in the method 2000 of FIG. 3. The source receives the communication from the destination (Step 2010) and determines what kind of request it contains (Step 2020). If the request requires the source to increase the data rate, the source increases the data rate by a predetermined factor $\Delta R$ (Rate=Rate*(1+$\Delta R$)) (Step 2030). The value of $\Delta R$ may be defined arbitrarily by an operator of the data network but, in one embodiment, $\Delta R$ is set at each source to be a ratio of the source's contracted rate to the egress rate of the destination $$\left(\frac{CR_i}{ER}\right).$$

If the request requires the source to decrease the data rate, the source calculates the new data rate (Step 2040). The new data rate would be its current data rate reduced by a predetermined factor $\Delta D$ (Rate=Rate*(1-$\Delta D$)). The source determines whether the new rate exceeds the source's contracted rate (Step 2050). If so, the source alters its data rate to conform to the new rate (Step 2060). Again, $\Delta D$ may be defined arbitrarily but, in one embodiment, $\Delta D$ is set to the ratio of the source's contracted rate to the egress rate of the destination $$\left(\frac{CR_i}{ER}\right).$$

However, if the new rate does not exceed the contracted rate, the source communicates to the destination denying the request (Step 2070).

Figure 1:
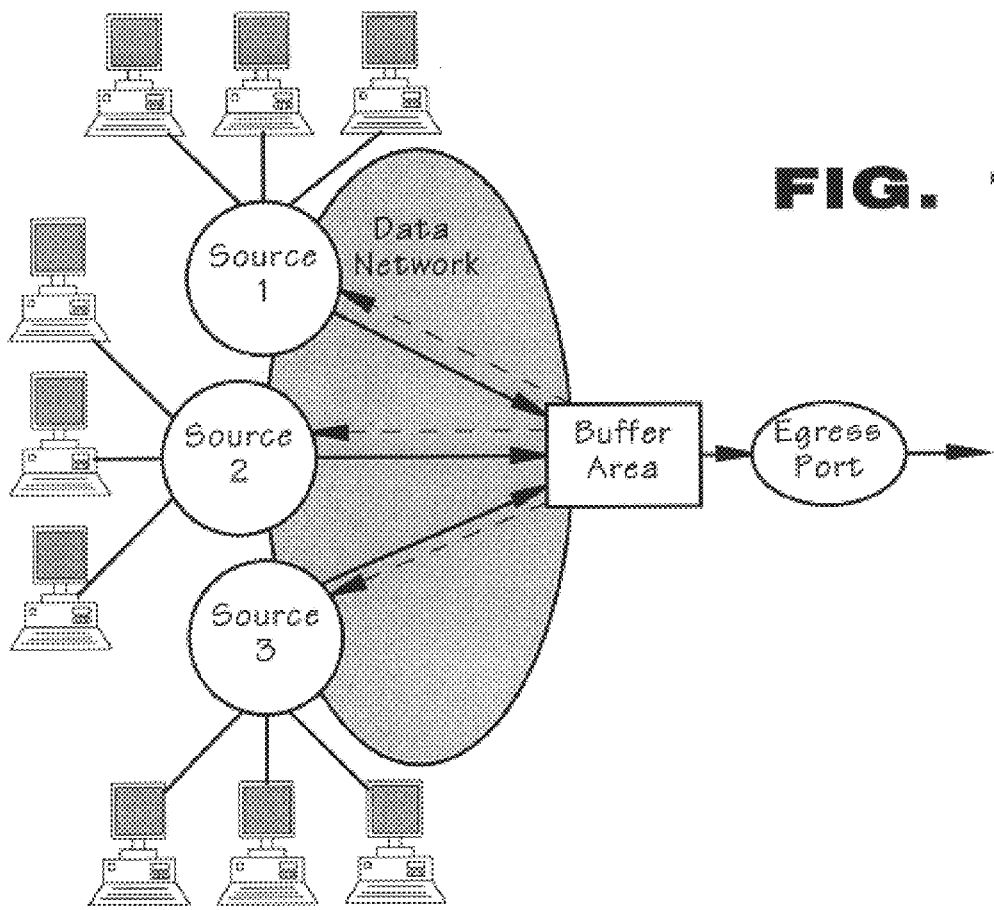
FIG. 1 is a block diagram illustrating a known data network in which the present invention may be applied.
Figure 4:
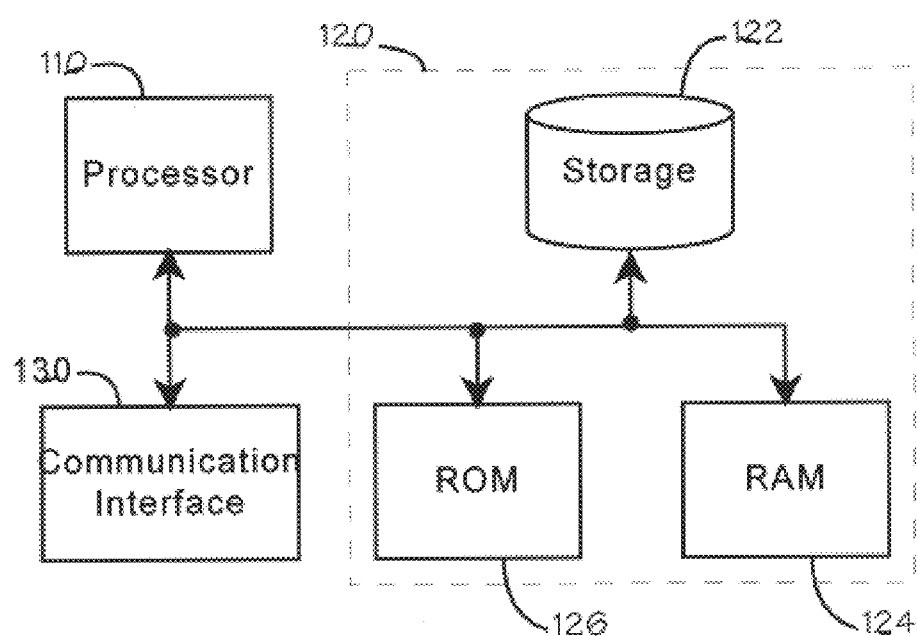
FIG. 4 is a block diagram of an egress port.

An embodiment of the egress port is shown in FIG. 4. There, the egress port 100 includes a processor 110 and a memory 120. The memory 120 may include a data storage device 122, such as a magnetic or optic storage device, RAM 124 and/or ROM memories 126. The data buffer is provided in the data storage device 122 and/or the RAM memory 124. The processor 110 executes program instructions stored in memory 120 to perform the method of FIG. 3. The egress port 100 receives data elements from the data network and communicates with sources in the network via a communication interface 130.

I claim:

1. A method of controlling congestion in data networks, comprising the steps of:

receiving a data element from the network, buffering the data element in one of a plurality of local buffers, the one local buffer associated with a source of the element, determining whether a total amount of data in the local buffers exceeds a global threshold and, when the global threshold is exceeded, requesting all sources to reduce a rate at which the sources deliver data elements to the network, and determining whether an amount of data in the local buffer associated with the source of the data element exceeds a local threshold and, when the local threshold is exceeded, requesting the source of the data element to reduce the rate at which the source delivers data elements to the network.

2. The method of claim 1, further comprising a step of, when neither the global threshold nor the local threshold is exceeded, requesting the source of the data element to increase the rate at which it delivers data elements to the network.

3. The method of claim 1, further comprising the steps of, subsequent to the step of requesting the source of the data element to reduce the rate at which it delivers data elements to the network, determining whether the source denied the request and, when the source denied the request, requesting other sources to reduce the rate at which they deliver data elements to the network.

4. The method of claim 1, wherein the receiving step occurs at an egress port of the data network.

5. The method of claim 1, wherein the data elements are frames of data routed by a frame relay network.

6. The method of claim 1, wherein the data elements are packets of data routed by a packet relay network.

7. The method of claim 1, wherein the data elements are cells of data routed by a cell relay network.

8. The method of claim 1, further comprising the steps of:

receiving a request at a source, determining what kind of request was received, when the request was a request to decrease the source's rate of delivery of data elements to the network, determining whether a current rate of delivery exceeds a predetermined minimum threshold, and when the current rate does not exceed the predetermined minimum threshold, denying the request.

9. An egress port of a data network, comprising:

a processor, a memory in communication with the processor, providing a data buffer divided into a plurality of local buffers, a communication interface in communication with the processor and the memory, the interface receiving data elements from the data network, wherein the processor:

identifies a source of the data element, causes the communication interface to store the data element in a local buffer associated with the source, determines whether an amount of data held in the buffer exceeds a global threshold and, if so, requests all sources in the data network to reduce rates at which the sources deliver data elements to the network, and determines whether an amount of data stored in the local buffer associated with the issuing source exceeds a local threshold and, if so, requests the issuing source via the interface to reduce the rate at which the issuing source delivers data elements to the network.

10. The egress port of claim 9, wherein when neither the global threshold nor the local threshold are exceeded, the processor requests the issuing source via the interface to increase the rate at which it delivers data elements to the network.

11. The egress port of claim 9, wherein the processor, after it requests the issuing source of the data element to reduce the rate at which it delivers data elements to the network, determines whether the issuing source denied the request and, when the source denied the request, the processor requests other sources to reduce the rate at which the other sources deliver data elements to the network.

12. The egress port of claim 9, wherein the data elements are frames of data routed by a frame relay network.

13. The egress port of claim 9, wherein the data elements are packets of data routed by a packet relay network.

14. The egress port of claim 9, wherein the data elements are cells of data routed by a cell relay network.

15. A method of controlling congestion in data networks, comprising the steps of:

receiving a data element from the network, buffering the data element in a local buffer associated with a source of the element, determining whether an amount of data in the local buffers exceeds a global threshold and, when the global threshold is exceeded, requesting all sources to reduce a rate at which the sources deliver data elements to the network, subsequent to the requesting step, determining whether the source denied the request and, when the source denies the request, requesting other sources to reduce the rate at which the other sources deliver data elements to the network.

* * * * *